United States Patent [19]
Peter et al.

[11] 3,818,590
[45] June 25, 1974

[54] TOOL FOR CUTTING CABLE SHEATHING

[75] Inventors: Eugen Peter, Backnang; Wolfgang Herold, Stuttgart, both of Germany

[73] Assignee: Licentia Patent-Verwaltungs-GmbH, Frankfurt, Germany

[22] Filed: Nov. 27, 1972

[21] Appl. No.: 309,665

[30] Foreign Application Priority Data
Nov. 27, 1971 Germany............................ 2158888
Nov. 27, 1971 Germany............................ 7144708

[52] U.S. Cl.................. 30/90.4, 30/90.9, 30/91.1
[51] Int. Cl............................................... B26b 27/00
[58] Field of Search ......... 30/90.4, 90.8, 90.9, 91.1, 30/91.2, 273, 276

[56] References Cited
UNITED STATES PATENTS
| | | | |
|---|---|---|---|
| 632,177 | 8/1899 | Darrach | 30/276 X |
| 2,180,457 | 11/1939 | Butkiewicz | 30/276 X |
| 2,468,407 | 4/1949 | Pifer | 30/90.4 X |
| 2,647,309 | 8/1953 | Chisena | 30/90.9 |
| 2,721,384 | 10/1955 | Bell | 30/294 X |
| 3,353,266 | 11/1967 | Goolsby | 30/276 X |

FOREIGN PATENTS OR APPLICATIONS
| | | | |
|---|---|---|---|
| 927,444 | 5/1963 | Great Britain | 30/8.5 |
| 1,235,777 | 5/1960 | France | 30/8.5 |

*Primary Examiner*—Al Lawrence Smith
*Assistant Examiner*—J. T. Zatarga
*Attorney, Agent, or Firm*—Spencer & Kaye

[57] ABSTRACT

A cable sheathing cutting tool in the form of pincers has a blade portion attached on one of the head portions of the tool. The front face of the blade acts as cutting edge and a slide shoe is attached along a longitudinal side of the blade. A wheel with teeth is disposed on a rotatable axle mounted in the second head portion of the tool. This axle is rotated in order to turn the wheel and move the cutting tool along the cable so that the blade can cut the sheathing.

3 Claims, 2 Drawing Figures

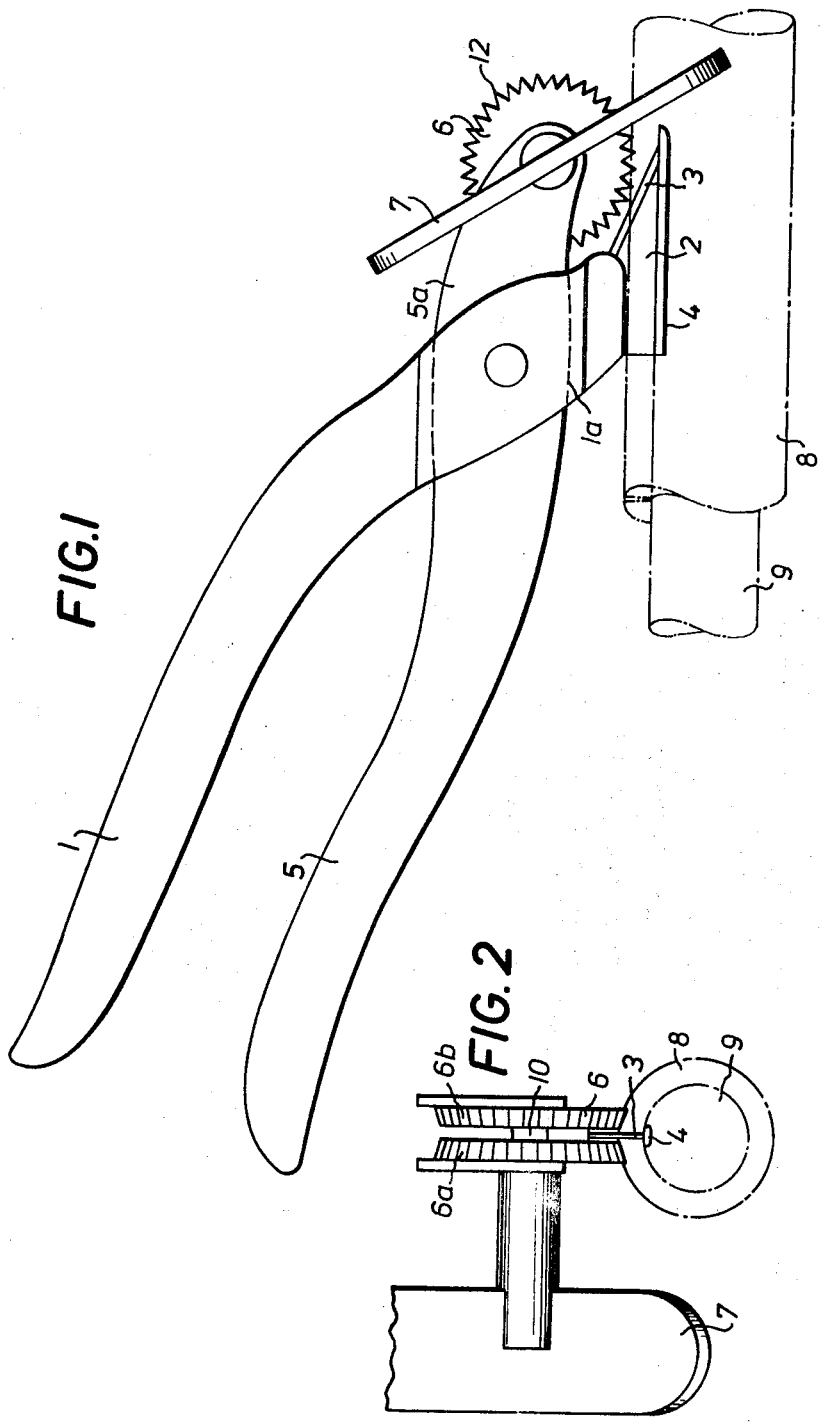

TOOL FOR CUTTING CABLE SHEATHING

BACKGROUND OF THE INVENTION

The present invention relates to a tool for cutting a plastic, metal or laminated sheathing of any thickness on cables to any desired depth.

Several cutting devices are known for cutting cable sheathing for installation of the cable. Examples of such known devices are: modified sheet metal shears as disclosed for example in German Offenlegungsschrift (Laid Open Application) No. 1,627,211, other types of pliers-like instruments, as disclosed for example in German Utility Patent Application No. G 18 73 656, and cable knives, as shown in Swiss Patent No. 343,987.

The above-mentioned modified sheet metal shears and the pliers-like instruments often damage the parts of the cable disposed underneath the sheathing which is being cut open.

Since sheet metal shears and cable knives can easily slip during handling they are often the cause of serious accidents and injury to the users.

SUMMARY OF THE PRESENT INVENTION

An object of the present invention is to provide a tool which cannot damage the conductor parts disposed underneath the sheathing to be cut and in which the danger of accidents is substantially reduced.

This is accomplished, in accordance with the present invention, by a cutting tool which has the shape of pincers, or pliers. A blade portion with a sharpened frontal face is fastened to one head portion of the pincers and a slide shoe is provided along one of the longitudinal sides of the blade. A rotatable wheel with pointed teeth is attached to the other head portion by an axle whose rotational axis is parallel to the axis of pivotal movement of the pincers. A winged handle is attached to the axle for rotating the wheel.

BRIEF DESCRIPTION OF THE DRAWINGS

FIG. 1 is a side elevational view of one preferred embodiment of the cutting tool in accordance with the present invention.

FIG. 2 is a partial front view of a modified embodiment of the cutting tool shown in FIG. 1.

DESCRIPTION OF THE PREFERRED EMBODIMENTS

The cutting tool, as shown in FIG. 1, is in the form of pincers having arms 1 and 5 with head portions 1a and 5a, respectively. The head portions 1a and 5a are pivotably arranged with respect to each other about an axis of the pincers. A blade 2 which has a sharpened front face forming a cutting edge 3 is fastened to the head portion 1a. A slide shoe is attached to the longitudinal side of the blade and it extends in the cutting direction. Rotatable wheel 6 having pointed teeth 12 is attached to the head portion 5a by an axle 10 which is rotatably mounted in the head portion 5a. A winged handle 7 is disposed on the axle 10 and is to be turned by the operator for rotating the wheel 6.

In use, the slide shoe 4 slides along the conductor portion 9 underneath cable sheathing 8 without damaging the conductor and the blade 2 cuts through the cable sheathing 8 when the arms of the pliers are pressed together and the tool is moved by rotating the winged handle 7.

A modified embodiment of the cutting tool shown in FIG. 1 is illustrated in the front view shown in FIG. 2. In this embodiment the wheel 6 is formed by two beveled gears 6a and 6b. The smaller diameter sides of the gears are arranged to face each other.

The tool may also be provided with a ratchet in place of the winged handle. Blade 2 may be attached to the head portion 1a in such a manner as to be replaceable.

It will be understood that the above description of the present invention is susceptible to various modifications, changes and adaptations, and the same are intended to be comprehended within the meaning and range of equivalents of the appended claims.

We claim:

1. A tool for cutting open cable sheathing, comprising in combination: means defining first and second head portions connected for movement with respect to each other about an axis; a blade portion having a sharpened frontal face and a longitudinal side extending parallel to the tool cutting direction and fastened to said first head portion; a slide shoe provided along said longitudinal side of said blade portion; an axle attached to said second head portion for rotation about an axis parallel to the axis of pivotal movement between said head portions; a wheel having teeth attached to said axle, said wheel being constituted by two beveled gears spaced from one another and having their sides with a smaller diameter facing one another, and said blade portion being in alignment with the space between said beveled gears; and turning means attached to said axle for rotating said wheel.

2. A tool as defined in claim 1, wherein said turning means is a winged handle.

3. A tool as defined in claim 1, wherein said blade portion is replaceable.

* * * * *